(12) United States Patent
Donoughe et al.

(10) Patent No.: US 7,919,942 B2
(45) Date of Patent: Apr. 5, 2011

(54) FRONT/REAR WIPER ALGORITHM

(75) Inventors: Michael F. Donoughe, Rochester, MI (US); Stacie N. Farina, Rochester, MI (US)

(73) Assignee: Chrysler Group LLC, Auburn Hills, MI (US)

(*) Notice: Subject to any disclaimer, the term of this patent is extended or adjusted under 35 U.S.C. 154(b) by 496 days.

(21) Appl. No.: 11/850,720

(22) Filed: Sep. 6, 2007

(65) Prior Publication Data
US 2009/0066285 A1    Mar. 12, 2009

(51) Int. Cl.
*H02P 7/00* (2006.01)

(52) U.S. Cl. .................. 318/280; 318/286

(58) Field of Classification Search .......... 318/280, 318/443, 445, DIG. 2, 400.01, 400.02, 268, 318/286, 700, 721, 779, 799, 807; 15/250.06, 15/250.07; 307/9.1
See application file for complete search history.

(56) References Cited

U.S. PATENT DOCUMENTS

| 4,131,834 | A |   | 12/1978 | Blaszkowski |
|---|---|---|---|---|
| 4,306,218 | A |   | 12/1981 | Leconte et al. |
| 4,317,073 | A |   | 2/1982 | Blaszkowski |
| 4,881,019 | A | * | 11/1989 | Shiraishi et al. ............ 318/68 |
| 4,999,550 | A | * | 3/1991 | Jones ......................... 318/50 |
| 5,982,123 | A | * | 11/1999 | Hornung et al. .......... 318/443 |
| 6,121,738 | A | * | 9/2000 | Meier et al. ............... 318/280 |
| 6,147,466 | A | * | 11/2000 | Stronczek ................. 318/443 |
| 6,249,098 | B1 | * | 6/2001 | Miyazaki et al. ......... 318/280 |
| 6,281,649 | B1 | * | 8/2001 | Ouellette et al. ......... 318/443 |
| 6,362,587 | B1 | * | 3/2002 | Hutter ....................... 318/444 |
| 6,555,980 | B2 | * | 4/2003 | Yabe ......................... 318/443 |
| 6,768,422 | B2 | * | 7/2004 | Schofield et al. ......... 340/602 |
| 6,940,244 | B2 | * | 9/2005 | Mitsumoto ................ 318/443 |
| 7,095,199 | B2 | * | 8/2006 | Hirose et al. ............. 318/444 |

* cited by examiner

*Primary Examiner* — Bentsu Ro
*Assistant Examiner* — Antony M Paul
(74) *Attorney, Agent, or Firm* — Ralph E. Smith

(57) ABSTRACT

A wiper system for a vehicle includes a first wiper assembly, a second wiper assembly spaced apart from the first wiper assembly, and a controller in communication with at least one of the first wiper assembly and the second wiper assembly. The controller controls at least one of the first wiper assembly and the second wiper assembly based on at least one of an aerodynamic characteristic of the vehicle and a soiling characteristic of the vehicle.

12 Claims, 2 Drawing Sheets

FRONT/REAR WIPER ALGORITHM

FIELD

The present disclosure relates to vehicle windshield wipers, and more particularly, to a control algorithm for a front and rear wiper system.

BACKGROUND

The statements in this section merely provide background information related to the present disclosure and may not constitute prior art.

Many modern vehicles, particularly sport utility and crossover vehicles, are equipped with wiper systems for both a front windshield and a rear windshield. Typically, the front and rear wiper systems are independently controlled and operated and therefore require separate control interfaces and related hardware. The separate control interfaces and hardware increase the overall cost and complexity of each system, as operators are required to monitor and adjust each system separately.

SUMMARY

A wiper system for a vehicle includes a first wiper assembly, a second wiper assembly spaced apart from the first wiper assembly, and a controller in communication with at least one of the first wiper assembly and the second wiper assembly. The controller controls at least one of the first wiper assembly and the second wiper assembly based on at least one of an aerodynamic characteristic of the vehicle and a soiling characteristic of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
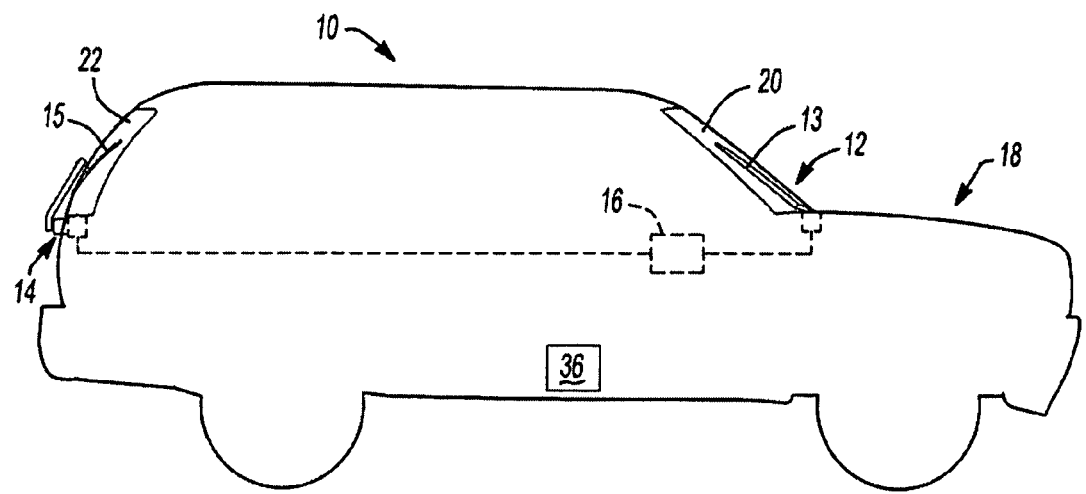
FIG. 1 is a schematic view of a vehicle including a wiper system according to the principles of the present invention.
Figure 2:
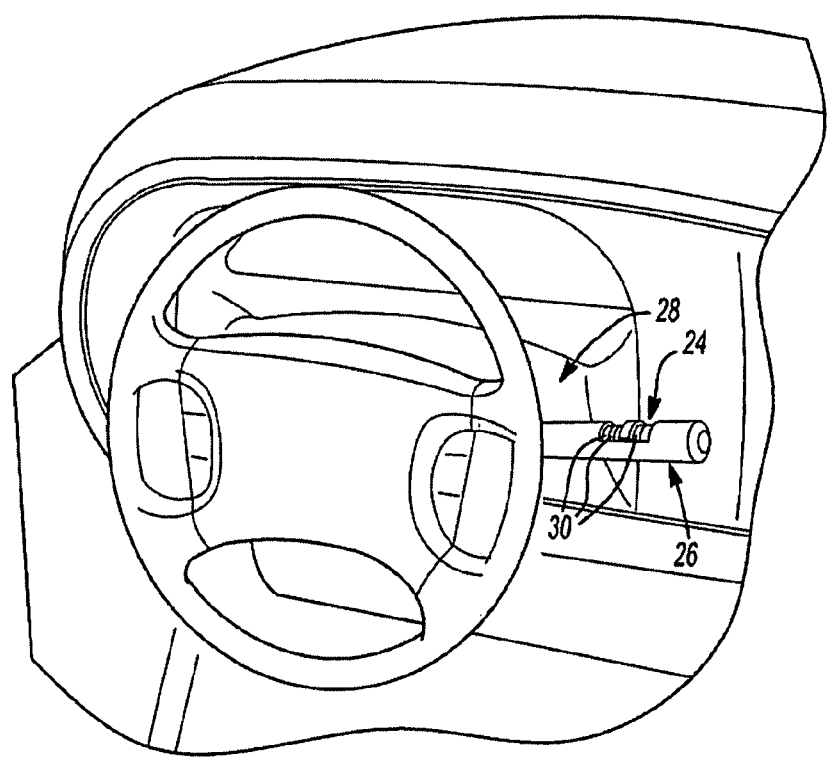
FIG. 2 is a perspective view of a user interface for use with the wiper system of FIG. 1.

The following description of the preferred embodiments is merely exemplary in nature and is not intended to limit the present disclosure, application, or uses. It should be understood that throughout the drawings, corresponding reference numerals indicate like or corresponding parts and features.

With reference to FIG. 1, a wiper system 10 is provided and includes a front-wiper assembly 12, a rear-wiper assembly 14, and a controller 16. The wiper system 10 may be installed in a vehicle 18 to clear precipitation and debris from a front windshield 20 and a rear windshield 22 of the vehicle 18.

The front-wiper assembly 12 may include a user interface 24 to allow a user to control the front-wiper assembly 12. The user interface 24 may be disposed on a stalk 26 protruding from a steering column 28 of the vehicle 18, may include a plurality of selectable positions 30, and may be in electrical communication with the controller 16.

The selectable positions 30 communicate with the controller 16 to allow the controller to drive a pair of front wipers 13 of the front-wiper assembly 12 at a desired speed and/or frequency. While the user interface 24 is described and shown as being disposed on a stalk 26 of the vehicle 18, the user interface 24 could alternatively be located at any location within the vehicle 18 such as, for example, on an instrument panel (not shown).

The rear-wiper assembly 14 is in electrical communication with the controller 16 to allow the controller 16 to selectively control a rear wiper 15 of the rear-wiper assembly 14. The controller 16 calculates an appropriate operating speed and/or frequency of the rear-wiper assembly 14 based on any or all of the following parameters: the selected position 30 of the user interface 24, the operating speed and/or frequency of the front-wiper assembly 12, the aerodynamic characteristics of the vehicle 18, the soiling characteristics of the vehicle 18, and the velocity of the vehicle 18.

Figure 3:
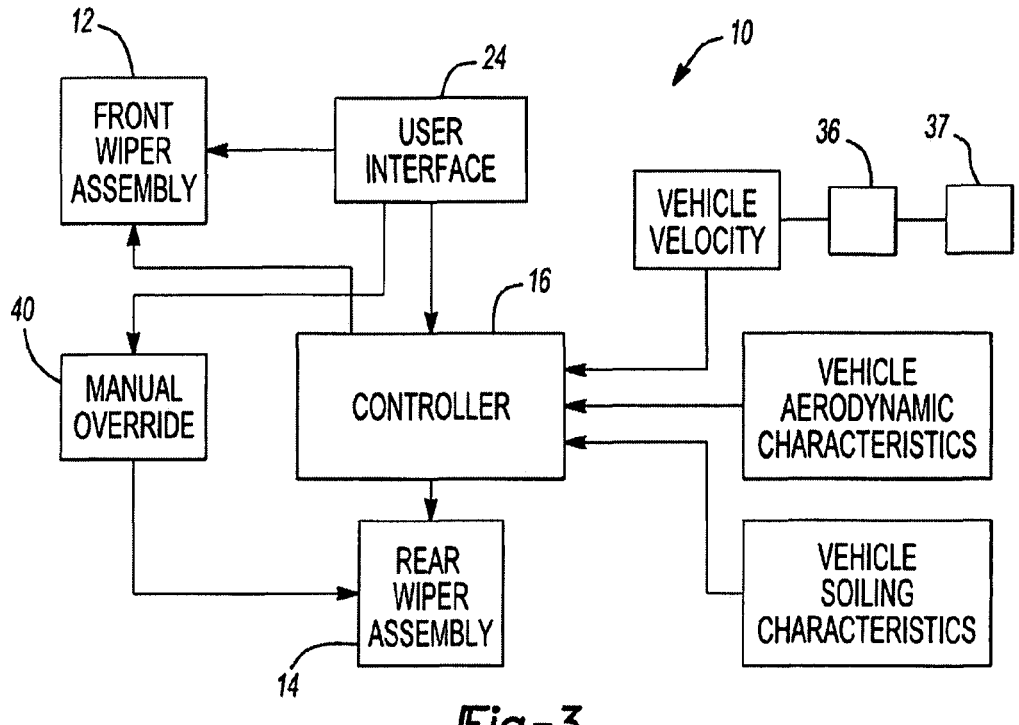
FIG. 3 is a schematic view of a wiper system according to the principles of the present invention.

With reference to FIG. 3, operation of the wiper system 10 will be described in detail. As described above, the user interface 24 is in communication with both the front-wiper assembly 12 and the controller 16. When the user interface 24 is adjusted and a position 30 is selected, the front wipers 13 of the front-wiper assembly 12 are driven at a desired speed and/or frequency. In one configuration, the input to the user interface 24 is sent directly to the front-wiper assembly 12 to control operation of the front wipers 13. In another configuration, input received by the user interface 24 is sent to the controller 16 to allow the controller 16 to control the front wipers 13 of the front-wiper assembly 12. In either configuration, the front wipers 13 are driven at a desired speed and/or frequency based on the input received by the user interface 24.

It should be noted that while the front wipers 13 may be directly controlled by the user interface 24, that the input received by the user interface 24 is transmitted to the controller 16 to allow the controller 16 to control the rear-wiper assembly 14, as will be described further below.

The controller 16 is in communication with the rear wiper 15 of the rear-wiper assembly 14 and controls the speed and/or frequency of the rear wiper 15 based on at least one of the input received by the user interface 24, a velocity of the vehicle 18, aerodynamic characteristics of the vehicle 18 and soiling characteristics of the vehicle 18.

The controller 16 receives information from the user interface 24 as to the speed and/or frequency of the front wipers 13 of the front-wiper assembly 12. The controller 16 may combine the information received from the user interface 24 with that of the velocity of the vehicle 18, aerodynamic characteristics of the vehicle 18, and soiling characteristics of the vehicle 18 to adjust the speed and/or frequency of the rear wiper 15 of the rear-wiper assembly 14.

The velocity of the vehicle 18 may be received by the controller 16 from a body controller 36. The body controller 36 may be in communication with a speed sensor 37, which provides the body controller 36 with a signal indicative of the speed of the vehicle 18. The aerodynamic characteristics of the vehicle 18 may be programmed into at least one of the controller 16 and/or the body controller 36 and provide the controller 16 and/or body controller 36 with information relating to the overall shape and profile of the vehicle.

If the body controller 36 contains information relating to the aerodynamic characteristics of the vehicle 18, the controller 16 may communicate with the body controller 36 to retrieve the aerodynamic characteristics of the particular vehicle 18 from the body controller 36. By storing the aerodynamic characteristics of the particular vehicle 18 in the body controller 36, a generic controller 16 of the wiper system 10 may be used with various vehicles 18 without requiring the controller 16 to be programmed for each particular vehicle 18. While the controller 16 may retrieve the aerodynamic characteristics of the particular vehicle 18 from the body controller 36, the controller 16 could be programmed with the aerodynamic characteristics of the particular vehicle 18.

The soiling characteristics of the vehicle 18 may be determined by testing the particular vehicle 18 via simulation, road testing, and/or laboratory testing. For example, the vehicle 18 may be driven through various environmental conditions such as wind, rain, and snow and over various road conditions such as uneven and unpaved road surfaces. The effects of the various combinations of environmental conditions and road conditions on the front and rear windshields 20, 22 may be observed as the vehicle 18 is tested. The observations as to the soiling of the front and rear windshields 20, 22 may be noted and programmed into the controller 16 and/or body controller 36.

As with the aerodynamic characteristics of the vehicle 18, the body controller 36 may only contain the aerodynamic characteristics of the particular vehicle 18 such that the controller 16 of the wiper system 10 must interrogate the body controller 36 to retrieve the soiling characteristics for the particular vehicle 18. By only storing the soiling characteristics of the particular vehicle 18 in the body controller 36, the controller 16 of the wiper system 10 may be used with any vehicle 18. Alternatively, the soiling characteristics of the vehicle 18 may be stored within both the controller 16 and the body controller 36.

In operation, the controller 16 analyzes the user input received from the user interface 24, the velocity of the vehicle 18, the aerodynamic characteristics of the vehicle 18, and the soiling characteristics of the vehicle 18 to adjust the speed and/or frequency of the rear wiper 15.

While the rear wiper 15 of the wear-wiper assembly 14 may be controlled by the controller 16, as described above, the rear wiper 15 may alternatively be controlled by a manual override system 40. For example, the rear-wiper assembly 14 may include a selection on the stalk 26 that allows a user to override the controller 16 and manually control the speed and/or frequency of the rear wiper 15. The manual override system 40 may be employed when the vehicle 18 is driven through environmental conditions that subject the vehicle to extreme soiling such as, for example, off road and/or muddy conditions. Under such conditions, a user may override the controller 16 via the manual override system 40 to clean the rear windshield 22 by actuating the rear wiper 15 of the rear-wiper assembly 14.

Figure 4:
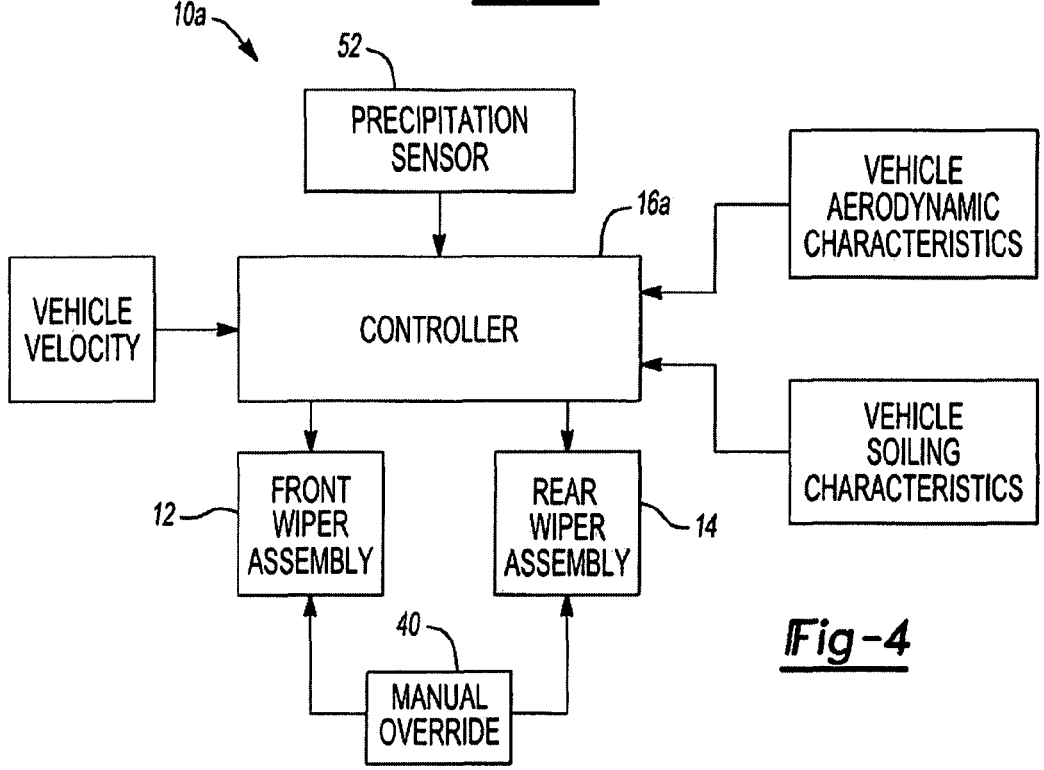
FIG. 4 is a schematic view of a wiper system according to the principles of the present invention.

With reference to FIG. 4, a wiper system 10a is provided and includes a front-wiper assembly 12, a rear-wiper assembly 14, and a controller 16a. In view of the substantial similarities in structure and function of the components associated with the wiper system 10 with respect to the wiper system 10a, like reference numerals are used hereinafter and in the drawings to identify like components while like reference numerals containing letter extensions are used to identify those components that have been modified.

The controller 16a may control one or both of the front-wiper assembly 12 and rear-wiper assembly 14 based on a velocity of the vehicle 18, aerodynamic characteristics of the vehicle 18, and soiling characteristics of the vehicle 18. In addition, the controller 16a may also control at least one of the front-wiper assembly 12 and rear-wiper assembly 14 based on information received from a precipitation sensor 52.

The precipitation sensor 52 may be disposed proximate to or on one or both of the front windshield 20 and rear windshield 22 to provide the controller 16a with information regarding moisture on either or both of the front windshield 20 and rear windshield 22. Based on the amount of moisture on either or both of the front windshield 20 and rear windshield 22, the controller 16a may control one or both of the front-wiper assembly 12 and rear-wiper assembly 14.

For example, if the precipitation sensor 52 indicates to the controller 16a that the front windshield 20 is being subjected to a heavy rainfall, the controller 16a may automatically instruct the front-wiper assembly 12 to actuate the front wipers 13 at a high speed and/or frequency. As with the wiper system 10, the controller 16a may utilize the speed and/or frequency of the front wipers 13 in controlling the rear wiper 15 of the rear-wiper assembly 14 to control the rear wiper 15 at a high speed and/or frequency. If the precipitation sensor 52 indicates to the controller 16a that a minimal amount of moisture is disposed on the front windshield 20, the controller 16a may drive the front wipers 13 of the front-wiper assembly 12 at a lower speed and/or frequency. The controller 16a may utilize the speed of the front wipers 13 in controlling the rear wiper 15 of the rear-wiper assembly 14 and similarly control the rear wiper 15 at a low speed and/or frequency.

In addition to utilizing information from the precipitation sensor 52, the controller 16a may also use the velocity of the vehicle 18, the aerodynamic characteristics of the vehicle 18, and the soiling characteristics of the vehicle 18 in determining the speed and/or frequency of the front wipers 13 and rear wiper 15. As such, the controller 16a can tailor the speed and/or frequency of the front wipers 13 and rear wiper 15 based on current environmental conditions (i.e., amount of rain, wind, ice, snow, etc.) as well as the speed of the vehicle 18, aerodynamic characteristics of the vehicle 18, and soiling characteristics of the vehicle 18.

A manual override system 40 may be in communication with the front-wiper assembly 12 and/or rear-wiper assembly 14 to permit a user to override the controller 16a and directly control the front-wiper assembly 12 and rear-wiper assembly 14. As with the wiper system 10, the manual override system 40 may override the controller 16a when the vehicle 18 is driven in extreme environmental conditions (i.e., heavy rain, snow, ice, etc.) and/or over rough and/or muddy road surfaces. The manual override system 40 permits the user to actuate the front wipers 13 of the front-wiper assembly 12 and/or rear wiper 15 of the rear-wiper assembly 14 to clear the front windshield 20 and/or rear windshield 22 if either windshield 20, 22 is heavily soiled. The manual override system 40 may be actuated by depressing a button and/or switch located on the stalk 26 or instrument panel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wiper system for a vehicle comprising:
a first wiper assembly;
a second wiper assembly spaced apart from said first wiper assembly; and
a controller in communication with said first wiper assembly and said second wiper assembly and controlling said first wiper assembly and said second wiper assembly based on a user input indicative of the speed and frequency of one of the first wiper assembly and the second wiper assembly, the overall shape and profile of the vehicle, an amount of precipitation experienced by the vehicle, and a soiling characteristic of the vehicle determined based on testing the particular vehicle model in various environmental conditions.

2. The wiper system according to claim 1, further comprising a manual override function operable to control said first wiper assembly and said second wiper assembly independent of said controller.

3. The wiper system according to claim 1, wherein said user input is received by a user interface disposed on a stalk of a steering column of the vehicle.

4. The wiper system according to claim 1, further comprising at least one precipitation sensor in communication with said controller and providing said amount of precipitation experienced by the vehicle to said controller.

5. The wiper system according to claim 1, wherein said at least one precipitation sensor includes two precipitation sensors with one sensor disposed on a front windshield of the vehicle and the other sensor disposed on a rear windshield of the vehicle.

6. The wiper system according to claim 1, further comprising a manual override function operable to control said front wiper assembly or said rear wiper assembly independent of said controller.

7. The vehicle according to claim 6, further comprising a user interface disposed on a stalk of a steering column of the vehicle, said user interface permitting a user to adjust said speed and frequency.

8. The wiper system according to claim 1, wherein said soiling characteristic is determined during said testing over various road conditions.

9. The wiper system according to claim 8, wherein observations as to the soiling of the vehicle during said testing are programmed into said controller as said soiling characteristic of the vehicle.

10. A vehicle comprising:
a front windshield;
a front wiper assembly selectively moving relative to said front windshield;
a rear windshield;
a rear wiper assembly selectively moving relative to said rear windshield; and
a controller in communication with said front wiper assembly and said rear wiper assembly and controlling said rear wiper assembly based on a speed and frequency of said front wiper assembly, a speed of the vehicle, the overall shape and profile of the vehicle, an amount of precipitation experienced by at least one of said front windshield and said second windshield, and a soiling characteristic programmed into said controller, said soiling characteristic including effects of various combinations of environmental conditions and road conditions on said front windshield and said rear windshield observed when testing the particular vehicle model.

11. The vehicle according to claim 10, further comprising at least one precipitation sensor in communication with said controller and providing said amount of precipitation to said controller information.

12. The vehicle according to claim 10, wherein said at least one precipitation sensor includes two precipitation sensors with one sensor disposed on said front windshield of the vehicle and the other sensor disposed on said rear windshield of the vehicle.

\* \* \* \* \*